(No Model.) 7 Sheets—Sheet 1.

W. J. PERKINS.
DRAG SAW ELEVATOR.

No. 294,804. Patented Mar. 11, 1884.

WITNESSES
INVENTOR (No Model.) 7 Sheets—Sheet 2.

W. J. PERKINS.
DRAG SAW ELEVATOR.

No. 294,804. Patented Mar. 11, 1884.

WITNESSES
INVENTOR
Attorneys (No Model.) W. J. PERKINS. 7 Sheets—Sheet 3.
DRAG SAW ELEVATOR.
No. 294,804. Patented Mar. 11, 1884.

(No Model.) 7 Sheets—Sheet 5.
W. J. PERKINS.
DRAG SAW ELEVATOR.
No. 294,804. Patented Mar. 11, 1884.
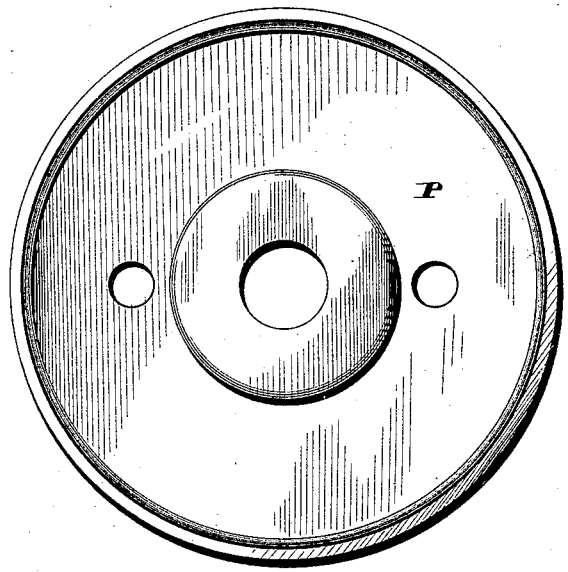
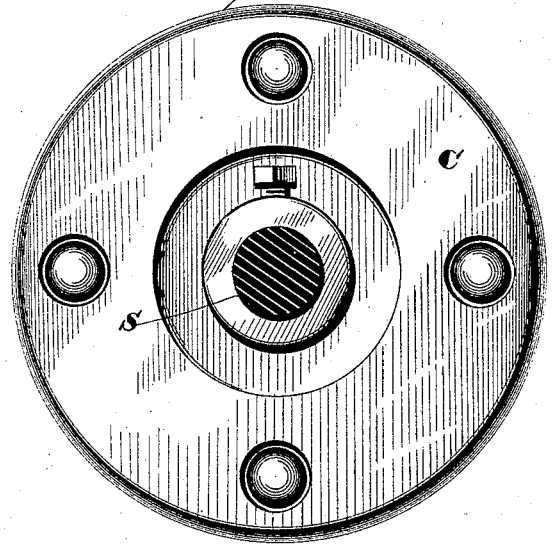
*Fig. 5.*

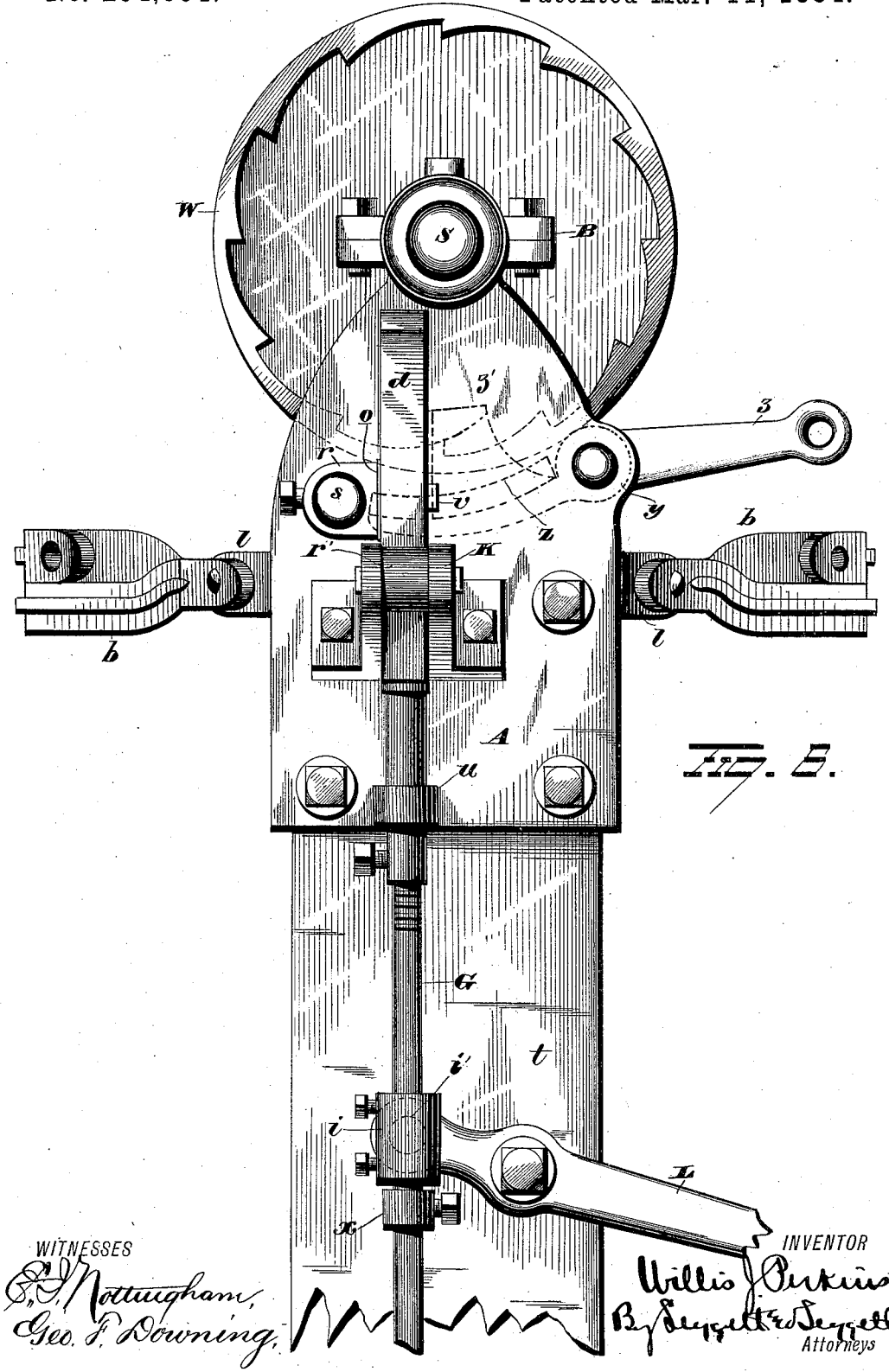

(No Model.) 7 Sheets—Sheet 7.
W. J. PERKINS.
DRAG SAW ELEVATOR.
No. 294,804. Patented Mar. 11, 1884.
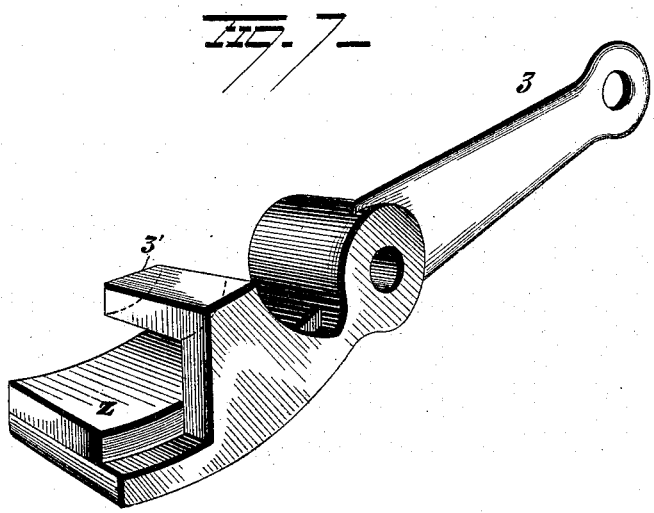
WITNESSES
E. J. Nottingham
Geo. F. Downing
INVENTOR
Willis J. Perkins
By Hyatt & Sennett
Attorneys
N. PETERS. Photo-Lithographer, Washington, D. C.

UNITED STATES PATENT OFFICE.

WILLIS J. PERKINS, OF GRAND RAPIDS, MICHIGAN.

DRAG-SAW ELEVATOR.

SPECIFICATION forming part of Letters Patent No. 294,804, dated March 11, 1884.

Application filed December 14, 1883. (No model.)

*To all whom it may concern:*

Be it known that I, WILLIS J. PERKINS, of Grand Rapids, in the county of Kent and State of Michigan, have invented certain new and useful Improvements in Drag-Saw Elevators; and I do hereby declare the following to be a full, clear, and exact description of the invention, such as will enable others skilled in the art to which it appertains to make and use the same.

My invention relates to an improvement in drag-saw elevators, the object being to provide a machine which shall both automatically and by means of a hand-controlling device lift a drag-saw out of cut promptly and hold it securely at the required elevation, a further object being to provide mechanism in connection with the elevator whereby the saw may be lowered gradually to its contact with the log.

Hitherto the saw in draw-saw machines has been raised and lowered by hand-power, applied either directly or by means of pulleys or levers. The great number of times the saw is required to be raised during a day, amounting to five hundred or more, has made it of great importance that a machine should be constructed whereby the time and labor devoted to this could be materially lessened.

With this end in view my invention consists in certain features of construction and combinations of parts, which will be fully described, and pointed out in the claims.

Figure 1:
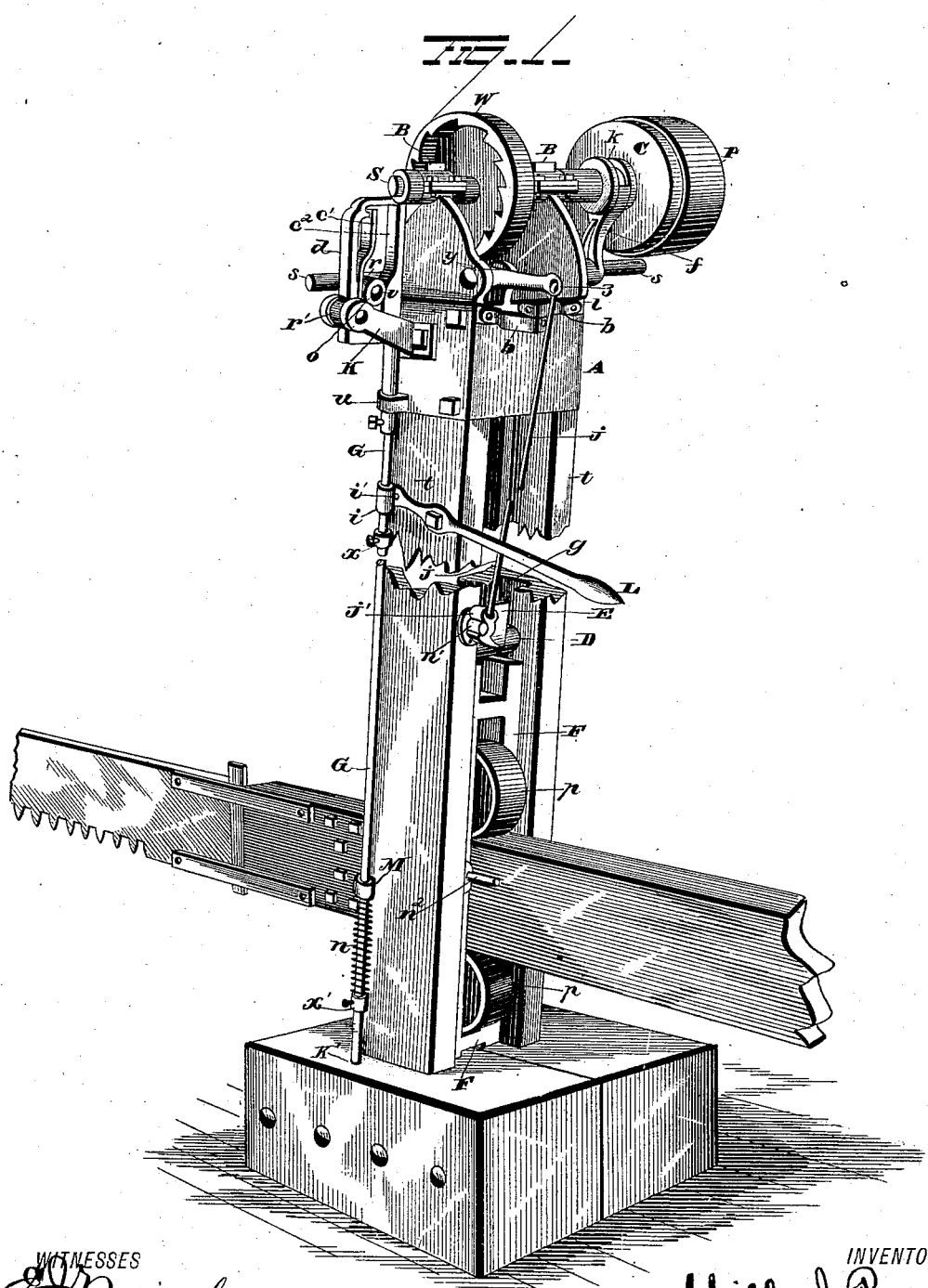
Figure 2:
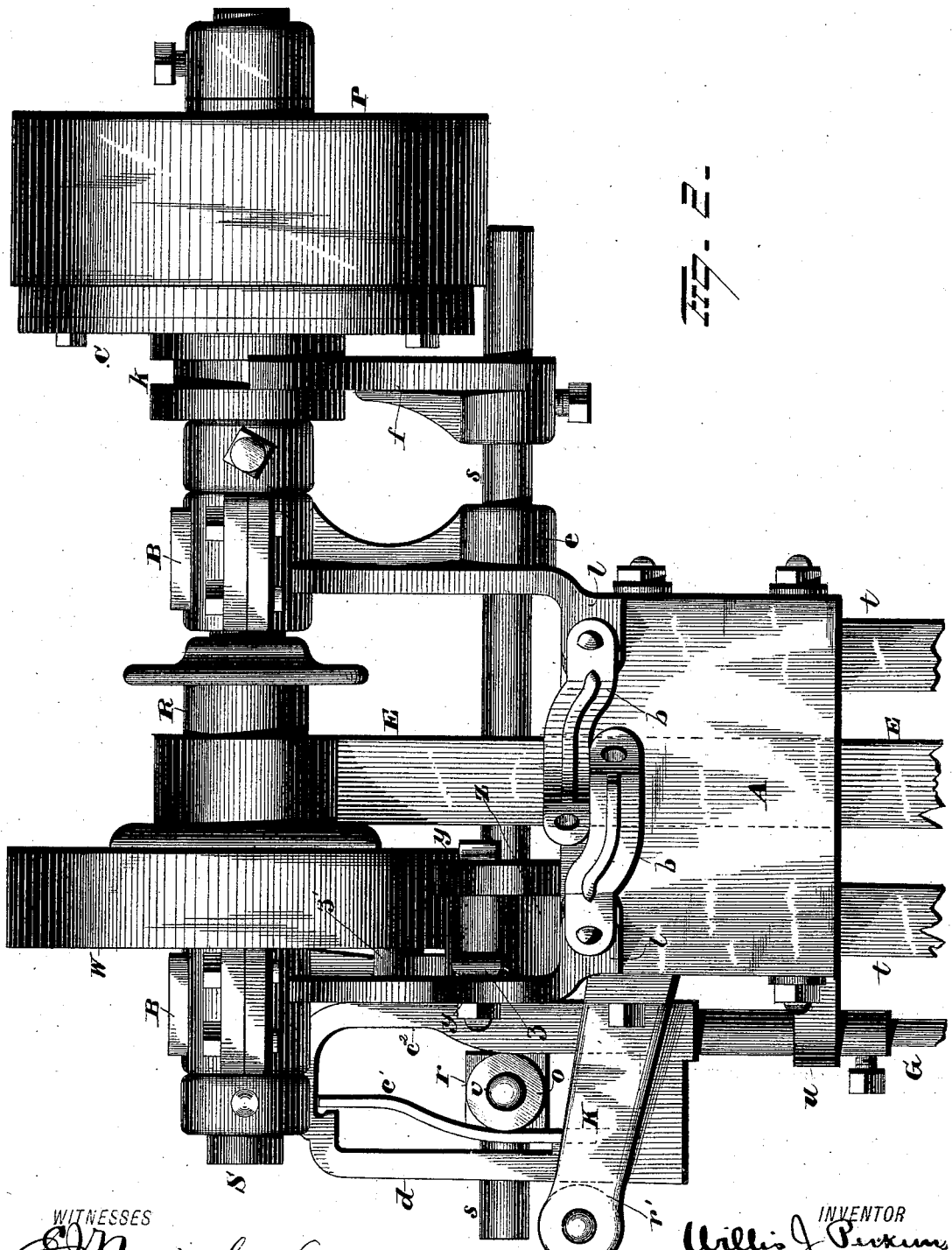
Figure 3:
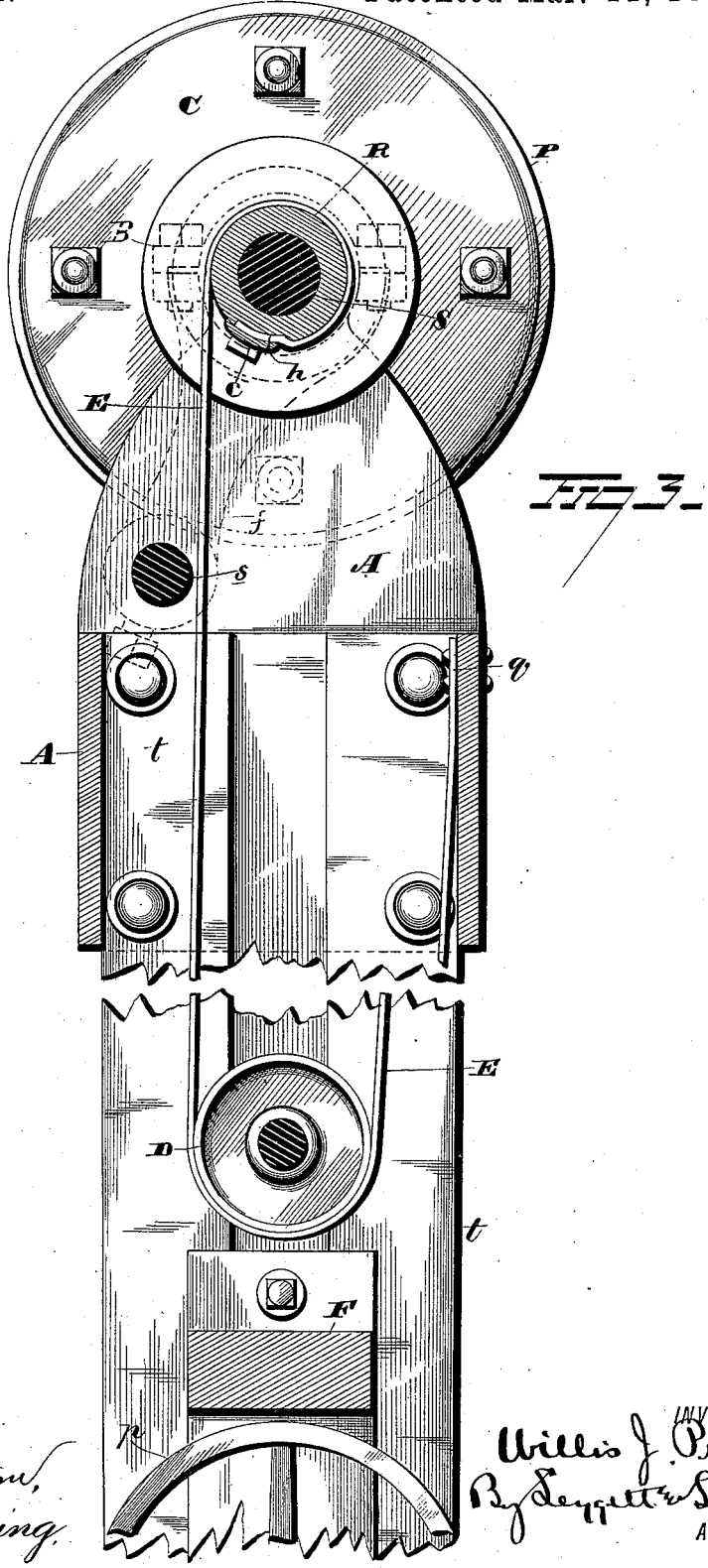
Figure 4:
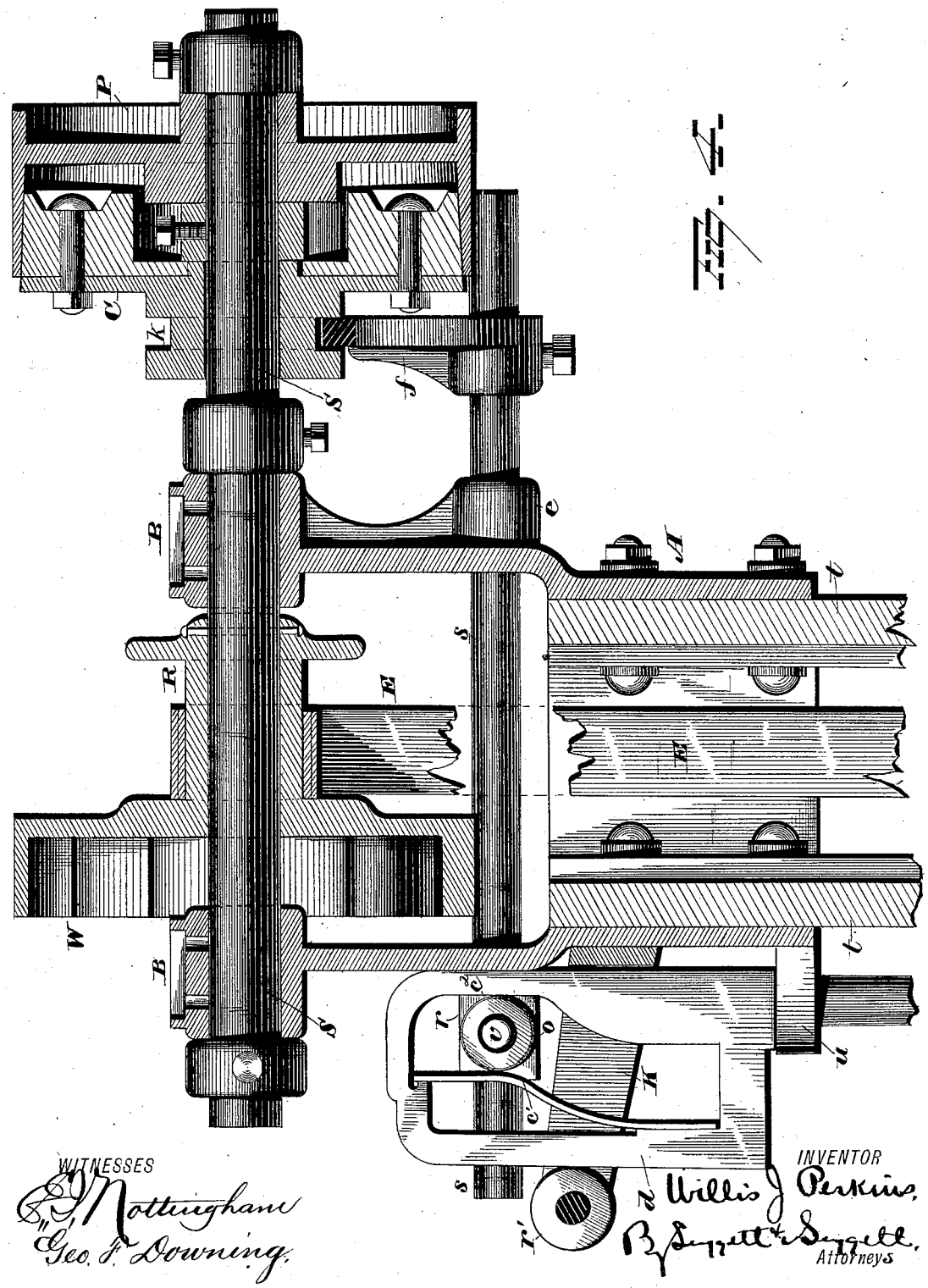

In the accompanying drawings, Figure 1 is a view in perspective of the elevator. Fig. 2 is a view in front elevation. Fig. 3 is a longitudinal sectional view taken at right angles to the shaft. Fig. 4 is a longitudinal sectional view taken lengthwise of the shaft. Fig. 5 is a detached view of the bevel friction-clutch, and Fig. 6 is a detached view of the ratchet-wheel, reel, and combined dog and brake. Fig. 7 is a detail view of the combined dog and brake.

A represents a cast-iron head-frame, bolted to the uprights $t\ t$, and provided with four lugs, $l$, to which the brace-rods $b$ are secured for the purpose of bracing the machine. The frame A is cast in one piece, and thus secures the uprights in position without the need of a cross-head. This frame A is further provided with the upward extensions, terminating in bearings B B, in which the shaft S is journaled.

This shaft S is provided at one end with the band-pulley P, mounted loosely thereon, the solid bevel friction-clutch or other suitable frictional device, C, mounted thereon, and caused to rotate with the shaft by a spline, and allowed a sliding motion, whereby it engages and disengages the pulley P, and with the drum R and the intaglio ratchet-wheel W, cast integral and mounted thereon, and caused to rotate with the shaft by a spline or other suitable means. This wheel W is provided with a laterally-extending rim, smooth on its outer surface, and provided with teeth on its inner surface.

The shear-frame F, provided with the anti-friction rollers $p\ p$, between which the sliding beam with saw attached moves, is constructed to slide up and down between the uprights $t\ t$ by tongue and groove $g$. The top part of this shear-frame F is provided with suitable bearings, in which roller D is journaled. The drum R is constructed with a longitudinal recess, $h$, in its face, in which, by means of a clamp, $c$, provided with screw-bolts, one end of the belt E is securely fastened. The belt E passes from the drum R around the roller D and back to the head-frame, near the upper portion of which, as at $q$, the other end of said belt is securely fastened. The head-frame is further provided with the bearings $e\ e$, in which a shaft, $s$, is allowed to slide. This shaft $s$ is provided near one end with the shifting-arm $f$, adjustably secured thereto, said arm $f$ being adapted to partially embrace a grooved collar, $k$, of the clutch C, whereby the clutch C is placed in and out of contact with the pulley P as the shaft $s$ slides right and left. The shaft $s$ is further provided with the adjustable collar $r$, having the arm-extension $v$, on which the roller $o$ is loosely mounted.

G represents the operating-rod. This rod G is provided at its upper end with the rectangular-shaped loop $d$, inside of which the cams $c'$ and $c^2$ are formed and adapted to engage the roller $o$. The cam $v'$ is formed by bolting a piece of spring metal of suitable shape to the inside of the loop, and $c^2$ by making the operating-rod the required shape. The rod G is further provided with the adjustable sliding sleeve $i$, having a projecting arm, $i'$, adapted to be received into a slot in the end of the operating-lever L. The rod G is still further provided with the adjustable collars $x\ x'$, against which the trip-arm M, one end of which is rigidly secured to the shear-frame, abuts. A spiral spring, $u$, is placed on the rod G above the collar $x'$, to cause the friction-clutch C to engage the pulley P more gradually. The operating-rod G is held in position at its upper end by the two-armed bracket K, bolted to the head-frame A. This bracket K embraces the loop of the rod G, and is provided with an anti-friction roller, $r'$, at its outer end. The rod G is further held in position by the lug $u$, cast integral with the head-frame, through which the cylindrical portion of said rod passes, having a sliding motion therein, and by the bracket or base K', bolted to one of the uprights $t$, through which said rod passes, having a sliding motion therein. The arm M has one end rigidly secured to the shear-frame, while the other is adapted to embrace the rod G or rest in close proximity thereto. The operating-lever L is pivoted to one of the uprights $t$, and, as before mentioned, the short end loosely embraces the arm projection of the sleeve $i$. The head-frame A is further provided with the lugs $y\ y$, between which the combined dog and friction-brake Z $z\ z'$ is loosely mounted. This combined dog and brake Z $z\ z'$ is so constructed and mounted with reference to the intaglio ratchet-wheel W that the same motion which disengages the dog from the internal teeth of the wheel W will apply the brake to the face of said wheel. This combined dog and friction-brake is operated by means of a rope, $j$, attached to the end of the lever-arm $z$. The rope $j$ is provided with a hook, $j'$, adapted to be retained on the pin $n'$, attached to one of the uprights $t$, and to be released from said pin $n'$ by the upward motion of the pin $n^2$, attached to the shear-frame F. The shaft S is held against sliding motion in the journals, and the pulleys mounted on said shaft are held horizontally in position by adjustable collars on said shaft. The uprights are held a suitable distance apart at the foot by a cross-piece framed or bolted between them or by the frame to which they are intended to be secured. The whole machine is adapted to be secured in an upright position to the frame of a drag-saw machine.

Having thus minutely pointed out the construction of the several parts, I will now explain the operation of the machine as a whole.

The pulley P is driven by a belt from a pulley on a counter-shaft. We will suppose the saw in motion and just placed in contact with the log. The rope $j$ is drawn down and hooked on the pin $n'$, thus disengaging the dog $z'$ from the teeth of the ratchet-wheel W, and allowing the frame F to slide down between the uprights as the saw advances through the log. When the log is sawed off, the handle of the lever L is raised, which causes the rod G to slide downward, thereby bringing the pulley $o$ in contact with the cam $c'$, which slides the shaft $s$ to the right and brings the friction-clutch C in contact with pulley P. The shaft S now revolves, winding the belt E, and thereby raising the shear-frame, and with it the sliding beam and saw. When the saw has reached the required elevation, the handle of the lever L is lowered, thereby sliding the rod G upward, and causing the roller to come in contact with the cam $c^2$, which slides the shaft $s$ to the left, thereby releasing the friction-clutch from the pulley P, and thus stopping the upward motion of the shear-frame, sliding beam, and saw. The saw is held in this elevated position by the dog $z'$ engaging the teeth of the ratchet-wheel W, the hook $j'$ on the rope $j$ having been released from the pin $n'$ by the upward motion of the pin $n^2$ on the shear-frame. The saw is now lowered at pleasure by pulling down on the rope $j$, thereby disengaging the dog $z'$, and at the same time applying the friction-brake Z, attached to the dog $z'$, to the face of the ratchet-wheel W. The hook $j'$ is now placed again on the pin $n'$, and the process just described is repeated.

The machine operates automatically as follows: The adjustable collar $x'$ is placed in such a position on the rod G that the arm M will come in contact with it just as the log is sawed off. The weight of the sliding beam, saw, and shear-sash will press the rod G down, thereby bringing the clutch in contact with pulley P, as before described. The adjustable collar $x$ is secured on the rod G in such a position that the arm M will come in contact with it at the moment when the saw is at the desired elevation, thereby causing the rod G to slide upward, and thus disengaging the clutch C. The dog $z'$ now falls in contact with the ratchet-wheel and holds the saw up, the hook $j'$ on the rope $j$ having been, as before explained, unhooked by the upward motion of the pin $n^2$.

Having fully described my invention, what I claim as new, and desire to secure by Letters Patent, is—

1. The combination, with a saw and a shear-frame, of a shaft, a friction-clutch mounted on said shaft, a band or belt connecting the shear-frame, and mechanism connected to the clutch and automatically operated by the shear-frame, whereby the upward movement of the latter can be discontinued, substantially as set forth.

2. The combination, with a shear-frame and saw, of a shaft, a loose pulley thereon, a sliding clutch, a belt connecting the saw-frame to the shaft, and intermediate mechanism for automatically engaging and disengaging the pulley and shaft.

3. The combination, with a saw and shear-frame, of a shaft, a loose pulley thereon, a sliding clutch, intermediate mechanism, whereby the movements of the shear-frame automatically control the movements of the shaft, and a suitable brake mechanism, all of the above parts combined as described.

4. In a drag-saw elevator, the combination, with the upright guides, of a head-frame provided with a shaft carrying a ratchet-wheel, a combined dog and brake adapted to engage said ratchet-wheel, and devices connecting the shear-frame and said shaft, whereby said shear-frame may be raised and lowered, substantially as set forth.

5. In a drag-saw elevator, the combination, with a saw and shear-frame, of a shaft, a band or belt connecting the shear-frame and shaft, a friction-clutch, a loose pulley, and a longitudinally-sliding shaft for moving the clutch into and out of contact with the pulley, substantially as set forth.

6. In a drag-saw elevator, the combination, with a shear-frame and saw, of a shaft to which the shear-frame is connected, a loose pulley on said shaft, a friction-clutch, a longitudinally-sliding rod for moving the friction-clutch, and mechanism connected to the shear-frame for moving the sliding rod, substantially as set forth.

7. The combination, with a saw and shear-frame, of a shaft to which the shear-frame is connected by a belt, a loose pulley mounted on said shaft, a clutch for engaging said pulley, a ratchet-wheel rigidly secured to the shaft, a dog for engaging the ratchet-wheel, a hook connected to the outer end of the dog by a cord, and adapted to be hooked over a pin on the machine-frame, and a pin or equivalent device on the shear-frame for releasing the hook, all of the above parts adapted to operate as described.

8. In a drag-saw elevator, the combination, with a shaft provided with a friction-clutch, a pulley, and a combined brake and ratchet-wheel, of a frame supporting said shaft and provided with a combined dog and friction-brake adapted to engage said combined brake and ratchet-wheel, a sliding rod provided with cams adapted to engage a sliding shaft and thereby operate said friction-clutch, and a shear-frame connected with first-named shaft and adapted to be operated by the rotation of said shaft, substantially as set forth.

9. The combination, with a saw and shear-frame, of a shaft, a belt or other device connecting the shear-frame to the shaft, a loose pulley mounted on the shaft, a clutch for engaging the pulley, a longitudinally-sliding shaft for moving the clutch, and provided with an anti-friction roller, and a longitudinally-movable rod provided with double cams at its upper end, between which the roller on the longitudinally-movable shaft rests, substantially as set forth.

10. In a drag-saw elevator, the combination, with a revolving shaft, a sliding clutch, and loose pulley mounted on said shaft, a longitudinally-sliding shaft, one end of which is connected to the clutch, and a longitudinally-sliding rod for moving the sliding shaft, the said rod being provided with adjustable collars, of a saw and shear-frame, the latter connected to the revolving shaft by a suitable band or belt, and provided with an arm adapted to come in contact with the collars on the longitudinally-sliding rod and move the said rod alternately up and down, substantially as set forth.

11. In a drag-saw elevator, the combination, with the shaft, loose pulley, friction-clutch, longitudinally-sliding shaft, longitudinally-sliding rod connected with said sliding shaft, as described, adjustable collars secured to the rod, and a spiral spring encircling a portion of the rod and resting on the lower collar, of a saw and shear-frame, the latter connected to the shaft by a suitable belt, and provided with an arm adapted to come in contact with the upper adjustable collar on the sliding rod and the spring seated on the lower collar and move the said rod, substantially as set forth.

12. In a drag-saw elevator, the combination, with a shaft, a loose pulley mounted thereon, a longitudinally-sliding shaft, a clutch, a longitudinally-sliding rod, the upper end of which is connected to the sliding shaft, a sleeve adjustably secured to the sliding rod, and a lever, one end of which is connected to the sleeve, of a saw, a shear-frame, and a belt connecting the shear-frame to the shaft, substantially as set forth.

In testimony whereof I have signed this specification in the presence of two subscribing witnesses.

WILLIS J. PERKINS.

Witnesses:
JOHN L. BUCHANAN,
HORACE TOMPKINS.